US 8,880,116 B2

(12) United States Patent
Jeong et al.

(10) Patent No.: US 8,880,116 B2
(45) Date of Patent: Nov. 4, 2014

(54) METHOD AND APPARATUS FOR SELECTING CELL TO INCREASE TRANSMISSION CAPACITY IN WIRELESS COMMUNICATION SYSTEM

(75) Inventors: Su-Ryong Jeong, Yongin-si (KR); Tae-Young Kim, Seongnam-si (KR); Chi-Woo Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 300 days.

(21) Appl. No.: 13/271,087

(22) Filed: Oct. 11, 2011

(65) Prior Publication Data
US 2012/0088539 A1  Apr. 12, 2012

(30) Foreign Application Priority Data
Oct. 11, 2010 (KR) .................. 10-2010-0098632

(51) Int. Cl.
H04B 7/00 (2006.01)
H04B 17/00 (2006.01)
H04W 72/04 (2009.01)
H04W 28/08 (2009.01)
H04W 48/20 (2009.01)
H04W 24/10 (2009.01)
H04W 48/16 (2009.01)
H04W 48/06 (2009.01)

(52) U.S. Cl.
CPC ....... H04B 17/0057 (2013.01); H04W 72/0486 (2013.01); H04W 24/10 (2013.01); H04W 28/08 (2013.01); H04W 48/16 (2013.01); H04W 48/20 (2013.01); H04W 48/06 (2013.01)
USPC ........ 455/525; 455/67.11; 455/524; 455/453; 455/434; 455/517; 370/310; 370/338; 370/328; 370/329; 370/343

(58) Field of Classification Search
CPC ......................... H04W 28/08; H04W 72/0486
USPC ................ 455/525, 524, 500, 517, 453, 434, 455/67.11, 422.1, 403, 550.1, 515, 445, 455/509, 575.1, 513, 514, 551, 561, 426.1, 455/426.2, 432.1–432.5, 435, 414, 412.1; 370/310, 338, 328, 329, 343
See application file for complete search history.

(56) References Cited

U.S. PATENT DOCUMENTS

| 2005/0136937 A1* | 6/2005 | Qian et al. .................. 455/452.2 |
| 2006/0293060 A1* | 12/2006 | Yang et al. ..................... 455/453 |
| 2009/0046665 A1 | 2/2009 | Robson et al. |
| 2009/0285159 A1 | 11/2009 | Rezaiifar et al. |
| 2010/0091651 A1 | 4/2010 | Chin et al. |
| 2010/0124933 A1 | 5/2010 | Chowdhury et al. |
| 2012/0195238 A1* | 8/2012 | Li ................................. 370/280 |

FOREIGN PATENT DOCUMENTS

WO    WO 2005/039202 A2    4/2005

OTHER PUBLICATIONS

International Search Report dated Apr. 17, 2012 in connection with International Application No. PCT/KR2011/007520.
Written Opinion of International Searching Authority dated Apr. 17, 2012 in connection with International Application No. PCT/KR2011/007520.
Extended European Search Report dated Feb. 6, 2014 in connection with European Application No. 11832726.1, 6 pages.

* cited by examiner

Primary Examiner — Keith Ferguson

(57) ABSTRACT

An apparatus is configured to perform a method for selecting a cell to increase transmission capacity in a wireless communication system. A Mobile Station (MS) can select a cell in a heterogeneous network system. The MS can receive a loading indicator for each of a plurality of Base Stations (BS); measure signal strength information for each of the BSs; and select one of the BSs using the loading indicator and the signal strength information. Therefore, the transmission efficiency of the system can be increased.

20 Claims, 11 Drawing Sheets

METHOD AND APPARATUS FOR SELECTING CELL TO INCREASE TRANSMISSION CAPACITY IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Oct. 11, 2010, and assigned Serial No. 10-2010-0098632, the entire disclosure of which is hereby incorporated by reference.

TECHNICAL FIELD OF THE INVENTION

The present invention relates generally to a wireless communication system. More particularly, the present invention relates to a method and an apparatus for selecting a cell to increase whole transmission capacity in a heterogeneous network system.

BACKGROUND OF THE INVENTION

Recently, as demand of data communication and various communication services increase in a wireless communication system, various methods for increasing transmission capacity are suggested. One of those methods is working on heterogeneous network technique. The heterogeneous network indicates a communication system including base stations having diverse phases, cell coverage and characteristics.

FIG. 1 illustrates a heterogeneous network system.

As shown in FIG. 1, the heterogeneous network indicates a system which overlays and operates a macrocell 100 and one or more picocells 102, 104 and 106 of difference coverage sizes. While it is not depicted in the heterogeneous network of FIG. 1, the macrocell 100 may further include at least one femtocell.

In the heterogeneous network, the compact cells (the picocells 102, 104, and 106 or the femtocell (not shown)) in the macrocell 100 can increase the whole transmission capacity of the system by reusing transmission resources. For example, provided that the macrocell 100 can utilize the transmission band 10 MHz, when one compact cell having the transmission band of 10 MHz is installed, the transmission band of 20 MHz in total can be ensured ideally. That is, when N-ary compact cells are installed in one macrocell, the transmission band corresponding to N times of the existing transmission band can be ideally secured and thus the throughput can increase N times.

However, even when the N-ary compact cells are installed in one macrocell in the actual environment, the obtained transmission gain is smaller than the N-times throughput because of interference between the heterogeneous cells or irregular distribution of mobile stations. That is, in the actual heterogeneous network system, interference between the macrocell and the compact cell and interference between the compact cells can degrade the performance. As a plurality of mobile stations is irregularly distributed in each compact cell, some resources can be unused to thus degrade the performance.

FIG. 2 depicts the distribution of mobile stations in the heterogeneous network system.

As shown in FIG. 2, in the heterogeneous network including a plurality of picocells 211 through 213 in a cell 202 of a macro Base Station (BS) 200, a plurality of Mobile Stations (MSs) 220 through 224 each can select their serving cell by measuring a signal strength quality factor of the cells. Hence, the picocell A 210 and the picocell C 212 can allocate resources to the MSs 221 and 225 which select the picocells as the serving cell, whereas the picocell B 211 and the picocell D 213 are not selected as the serving cell by any MSs and thus cannot allocate the resource as shown in FIG. 2. As a result, while the transmittable resource amount increases thanks to the picocell B 211 and the picocell D 213, the actual throughput is not enhanced. As such, when there are many picocells not allocating the resource to the MS in the heterogeneous network, the whole transmission efficiency of the heterogeneous network is decreased.

In addition, although an MS accesses the picocell, the data amount to be transmitted by the MS is limited in the actual cellular environment. Thus, the unused transmission resource can generate in each picocell and the transmission efficient is deteriorated. In this regard, a cell selection method for increasing the transmission efficiency in the heterogeneous network is demanded.

SUMMARY OF THE INVENTION

To address the above-discussed deficiencies of the prior art, it is a primary aspect of the present invention to provide a method and an apparatus for selecting a cell to increase whole transmission capacity in a heterogeneous network system.

Another aspect of the present invention is to provide a method and an apparatus for selecting a serving cell for uplink and downlink of a mobile station in a heterogeneous network system.

Yet another aspect of the present invention is to provide a method and an apparatus of a mobile station for selecting a serving cell by considering a loading indicator of neighboring base stations in a heterogeneous network system.

Still another aspect of the present invention is to provide a method and an apparatus of a mobile station for selecting a serving cell by considering a signal strength quality factor and a loading indicator of neighboring base stations in a heterogeneous network system.

According to one aspect of the present invention, a method of a Mobile Station (MS) for selecting a cell in a heterogeneous network system includes receiving a loading indicator for each of a plurality of Base Stations (BS); measuring signal strength information for each of the BSs; and selecting one of the BSs using the loading indicator and the signal strength information.

According to another aspect of the present invention, a method of a BS for cell selection of an MS in a heterogeneous network system includes determining a loading indicator in a cell; and transmitting the determined loading indicator to an MS in the cell.

According to yet another aspect of the present invention, an apparatus of an MS for selecting a cell in a heterogeneous network system includes a transceiver that can receive a loading indicator for each of a plurality of BSs; and a controller that can measure signal strength information for each of the BSs, and select one of the BSs using the loading indicator and the signal strength information.

According to still another aspect of the present invention, an apparatus of a BS for cell selection of an MS in a heterogeneous network system includes a controller that can determine a loading indicator in a cell; and a transceiver that can transmit the determined loading indicator to an MS in the cell.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning, and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
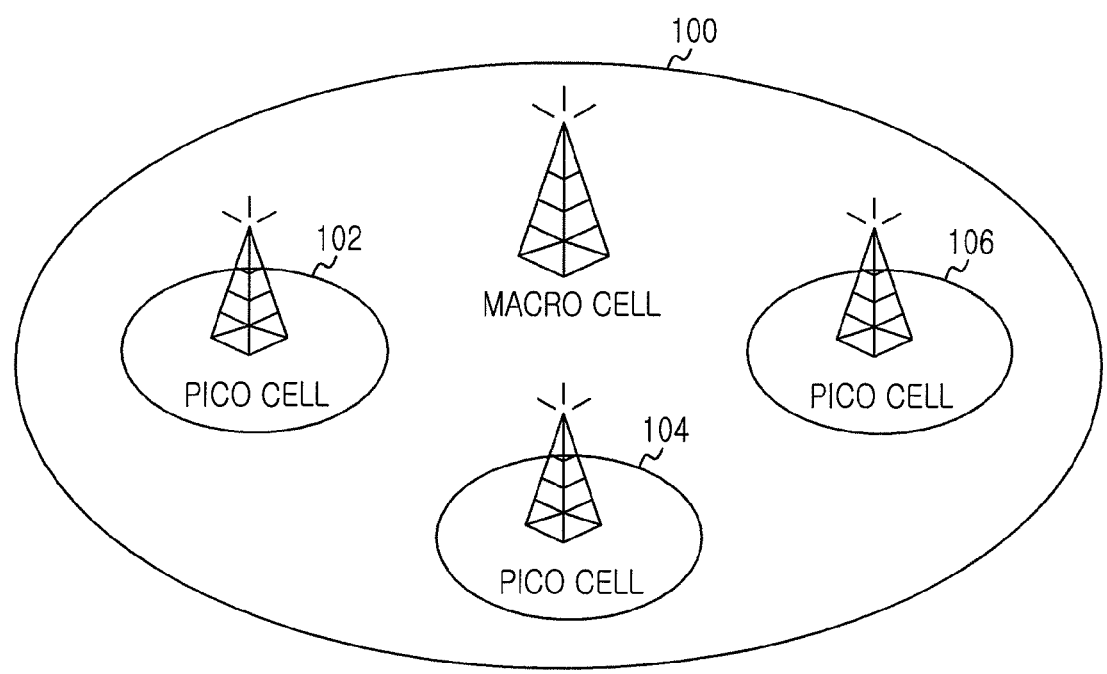
FIG. 1 illustrates a heterogeneous network system.
Figure 2:
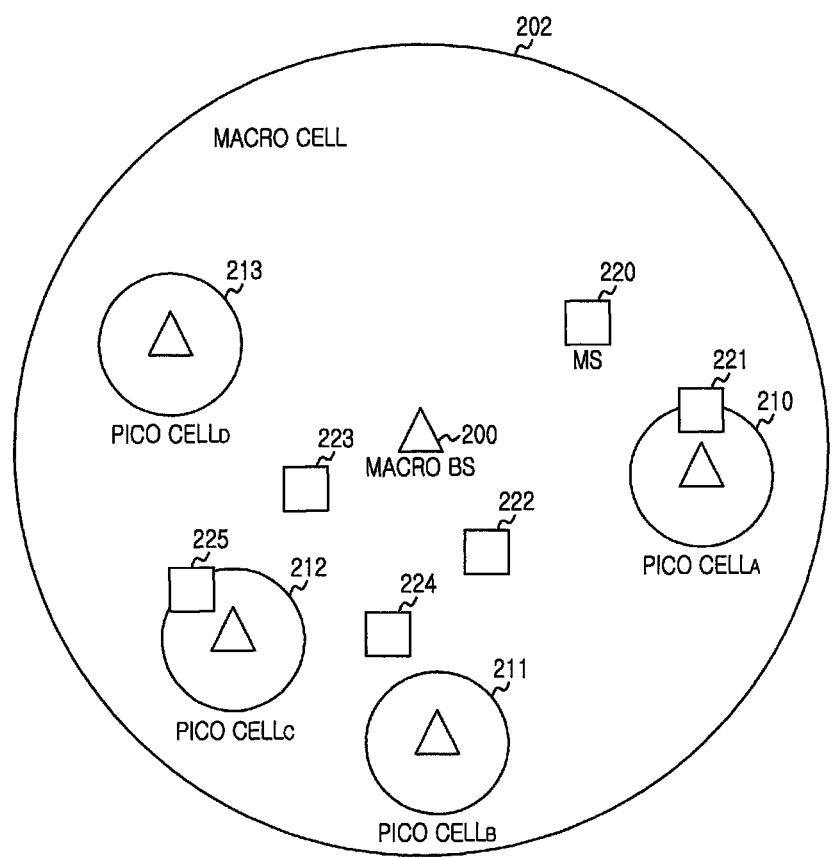
FIG. 2 illustrates distribution of mobile stations in the heterogeneous network system.

FIGS. 3 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for selecting a cell to increase whole transmission capacity in a heterogeneous network system.

The heterogeneous network indicates a communication system including base stations having diverse phases, cell coverage and characteristics. Hereinafter, to ease the understanding, a communication system including a macro Base Station (BS) and a compact BS is explained by way of example. Herein, the compact BS represents nodes having the smaller cell coverage than the macro BS, such as pico BS, femto BS, micro BS, a relay node, and Radio Remote Head (RRH).

Hereinafter, it is assumed that a Mobile Station (MS) travels in an overlapping area of two or more cells and needs to select any one of the two or more cells in the heterogeneous network system. For example, it is assumed that the MS travels in the overlapping area of one macrocell and one compact cell, the overlapping area of one macrocell and two or more compact cells, or the overlapping area of two or more macroce Is and one compact cell, and needs to select its cell.

It is assumed that the MS receives a limited partial signal or the whole signal from one or more BSs including a macro BS or a compact BS, and thus receive information through the signal. For example, using well-known conventional schemes such as Time Domain Multiplexing (TDM) or Frequency Domain Multiplexing (FDM), the MS can receive information from the macro BS and the compact BS in the overlapping area of the macro BS cell and the compact BS cell.

Figure 3:
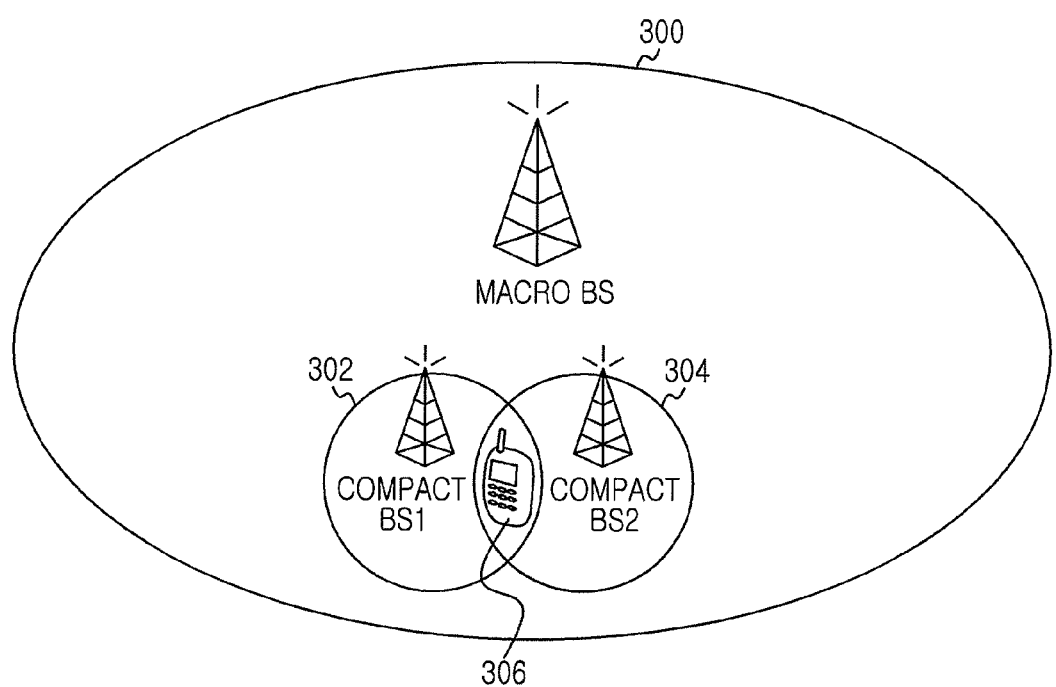
FIG. 3 illustrates a heterogeneous network system according to an exemplary embodiment of the present invention.

FIG. 3 illustrates a heterogeneous network system according to an exemplary embodiment of the present invention.

As shown in FIG. 3, in the heterogeneous network system including a macro BS 300 and two or more compact BSs 302 and 304, an MS 306 travels in the overlapping area of the BS cells to facilitate the understanding.

The macro BS 300 and the compact BSs 302 and 304 each collect their loading information. Herein, the loading information collected by the BS can be a past statistical indicator, a current circumstantial indicator, and a future expected indicator. The past statistical indicator indicates an indicator of the past loading information such as average loading information from the past up to the present or average loading information over a certain time, and the current circumstantial indicator indicates indicators of the loading situation in the current cell such as the number of MSs in the current cell or the number of MSs in an active mode in the cell. The future expected indicator indicates indicators expecting future transmission such as data amount per traffic queuing in a queue buffer of the BS or a required data transmission space accumulated by a BandWidth REQuest (BW-REQ) message transmitted by the MSs in the BS, and an indicator value expecting future transmission received from an upper node such as Base Station Controller (BSC). Herein, those indicators can be determined or predicted using various conventional methods which are well-known.

The macro BS 300 and the compact BSs 302 and 304 collecting their loading information determine their loading indicator based on the collected loading information. Herein, the loading indicator can use a loading rate, a loadable rate, a cell weight, a loadable bandwidth, an effective bandwidth, and an expected capacity. The loading rate can be defined as a ratio of an expected loading band to a whole transmittable band as expressed in Equation 1, and the loadable rate can be determined by subtracting the loading rate from a maximum value of the loading rate.

$$\text{Rate}_{loading} = BW_{expect}/BW_{all} \quad \text{[Eqn. 1]}$$

In Equation 1, $\text{Rate}_{loading}$ denotes the loading rate, $BW_{expect}$ denotes the expected loading band, and $BW_{all}$ denotes the whole transmittable band.

$$\text{Rate}_{loadable} = 1 - \text{Rate}_{loading} \quad \text{[Eqn. 2]}$$

In Equation 2, $\text{Rate}_{loadable}$ denotes the loadable rate and 1 is the maximum value of the loading rate.

The cell weight can be determined to a value of 0~1 according the loading degree of the corresponding BS. For example, when the random loading value determined based on the collected loading information is greater than a first threshold, the BSs 300, 302, and 304 can determine that it is hard to support a new MS, and set the cell weight to zero or a value close to zero. When the loading value of the BS is less than a second threshold, the BSs 300, 302, and 304 can determine that they can support a new MS, and set the cell weight to 1 or a value close to 1. When the random loading value is greater than the first threshold, the BSs 300, 302, and 304 can blacklist themselves to exclude themselves from the cell selection of the MSs. When the random loading value is less than the second threshold, the BSs 300, 302, and 304 can remain as the cell selection target of the MSs and put themselves on a white list to lead the cell selection of the MSs.

The loadable bandwidth can be determined by multiplying the loadable rate by the whole transmittable band as expressed in Equation 2. The effective bandwidth indicates an additional transmittable bandwidth and can be determined using information of queue buffers per traffic. The effective bandwidth can be set to different values according to the type of the traffic using the information of the queue buffers per traffic.

Upon determining the loading indicator, the macro BS 300 and the compact BSs 302 and 304 can send their determined loading indicator to the MS 306 through a broadcast channel, a frame header, or a preamble. The loading indicator of the BSs 300, 302, and 304 can be transmitted from the corresponding BS directly to the MS 306. When the compact BSs 302 and 304 transmit their loading indicator to the macro BS 300, the macro BS 300 can transmit its loading indicator and the received loading indicators of the compact BSs 302 and 304, to the MS 306.

The MS 306 receives the loading indicators of the macro BS 300 and the compact BSs 302 and 304, measures a signal strength quality factor of each of the BSs, and selects its cell using the loading indicators and the signal strength quality factor. Herein, the signal strength quality factor indicates channel state between the MS and the corresponding BS, such as received signal strength or signal to interference and noise ratio. The MS 306 can compare the signal strength quality factor of each BS and a threshold and exclude the BS having the signal strength quality factor less than the threshold from the cell selection.

Herein, based on the loading indicator, the MS 306 can select its serving cell in various manners. For example, the MS 306 can compare the loading rate of the BSs which can service the MS 306, and select the BS having the smallest loading rate as expressed in Equation 3. The MS 306 can compare any one of the loadable rate, the cell weight, the loadable bandwidth, and the effective bandwidth of the serviceable BSs and select the BS having the greatest value as the serving BS based on Equation 4.

$$\text{SelectBS} = \underset{i \in [0, I-1]}{\text{argmin}}(\text{Rate}_{loading(i)}) \quad \text{[Eqn. 3]}$$

In Equation 3, SelectBS denotes the selected BS and $\text{Rate}_{loading(i)}$ denotes the loading rate of the BS i.

$$\text{SelectBS} = \underset{i \in [0, I-1]}{\text{argmax}}(\text{Rate}_{loadable(i)} | W_{(i)} | BW_{loadable(i)} | BW_{effective(i)}) \quad \text{[Eqn. 4]}$$

In Equation 4, SelectBS denotes the selected BS, $\text{Rate}_{loadable(i)}$ denotes the loadable rate of the BS i, $W_{(i)}$ denotes the cell weight of the BS i, $BW_{loadable(i)}$ denotes the loadable bandwidth of the BS i, and $BW_{effective(i)}$ denotes the effective bandwidth of the BS i. That is, based on Equation 4, the MS 306 can select one of the four loading indicatorst $\text{Rate}_{loadable(i)}$, $W_{(i)}$, $BW_{loadable(i)}$ and $BW_{effective(i)}$, compare the selected loading indicator of the serviceable BSs, and select the BS of the greatest loading indicator as the serving BS. For example, the MS 306 can compare $BW_{loadable(i)}$ of the serviceable BSs and select the BS of the greatest $BW_{loadable(i)}$ as the serving BS as expressed in Equation 4.

Herein, the MS 306 can select the serving cell in various manners by considering the loading indicator together with the signal strength quality factor. For example, the MS 306 can select the serving cell by taking account of the loading indicator and the signal strength quality factor of the BSs based on Equation 5.

$$SelectBS = \underset{i \in [0, I-1]}{\operatorname{argmax}}(f(P_i, L_i)) \quad \text{[Eqn. 5]}$$

In Equation 5, SelectBS denotes the selected BS, $P_i$ denotes the signal strength quality factor of the BS i, and $L_i$ denotes the loading indicators of the BS i.

More specifically, the MS 306 can select the serving cell based on Equation 6, Equation 7, and Equation 8.

$$SelectBS = \underset{i \in [0, I-1]}{\operatorname{argmax}}(SINR_i + \alpha W_i) \quad \text{[Eqn. 6]}$$

In Equation 6, $SINR_i$ denotes a Signal to Interference and Noise Ratio (SINR) for the BS i, $W_i$ denotes the cell weight for the BS i, and $\alpha$ denotes a random coefficient.

$$SelectBS = \underset{i \in [0, I-1]}{\operatorname{argmax}}(BW_{loadable(i)} \log_{10}(1 + SINR_i)) \quad \text{[Eqn. 7]}$$

$BW_{loadable(i)}$ denotes the loadable bandwidth of the BS i, and $SINR_i$ denotes the SINR of the BS i.

Equation 7 determines the transmission capacity by multiplying the SINR of the channel by the transmission band with respect to a certain channel, and the MS can check the degree of the transmission capacity which can be expected through the corresponding BS.

$$SelectBS = \underset{i \in [0, I-1]}{\operatorname{argmax}}(BW_{effective}(i, T) \times \log_{10}(1 + SINR_i)) \quad \text{[Eqn. 8]}$$

$BW_{effective}(i,T)$ denotes the effective bandwidth of the BS for the traffic T, and $SINR_i$ denotes the SINR of the BS i.

Equation 8 determines the transmission capacity of each BS for particular traffic so that the MS can select the BS providing the highest transmission capacity according to the traffic type. Accordingly, the MS can simultaneously select different BSs for the traffics.

Now, a case where each BS transmits its loading indicator directly to the MS and a case where one BS transmits its loading indicator and the loading indicators of the neighboring BSs by exchanging the loading indicator between the BSs are explained based on the above.

Figure 4:
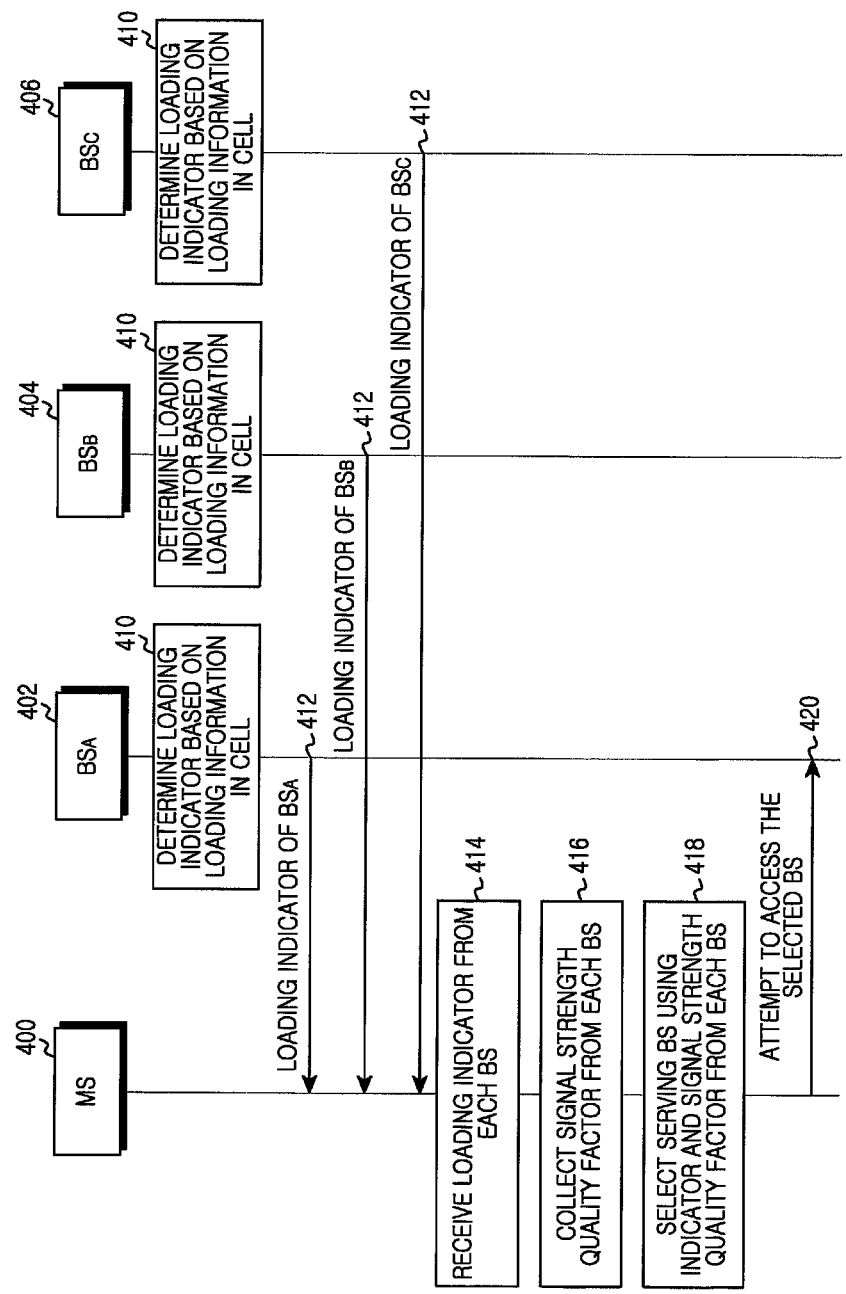
FIG. 4 illustrates signal flows of cell selection of a mobile station in the heterogeneous network system according to an exemplary embodiment of the present invention.

FIG. 4 illustrates signal flows of the cell selection of the MS in the heterogeneous network system according to an exemplary embodiment of the present invention. Herein, each BS transmits its loading indicator directly to the MS. A $BS_A$ 402, a $BS_B$ 404, and a $BS_C$ 406 can be the macro BSs or the compact BSs.

Referring to FIG. 4, the BSs 402, 404, and 406 each collect the loading information in their cell and determine the loading indicator based on the collected loading information in step 410, and then transmit their loading indicator to an MS in the cell in step 412. In doing so, the BSs 402, 404, and 406 each can transmit the loading indicator through a broadcast channel receivable by one or more MSs, a broadcast channel receivable even by MSs which merely complete initial synchronization, a frame header, or a preamble.

The MS 400 traveling in the overlapping cell area of the BSs 402, 404, and 406 receives the loading indicators from the BSs 402, 404, and 406 in step 414, and collects the signal strength quality factor of the BSs 402, 404, and 406 in step 416.

Using the received loading indicators and the signal strength quality factor, the MS 400 selects one of the BSs 402, 404, and 406 as its serving BS in step 418. Herein, the MS 400 can select the serving BS based on Equation 3 through Equation 8. The MS 400 compares the signal strength quality factor of the BSs and a preset threshold, and excludes the corresponding BS from the cell selection when the BS has the signal strength quality factor smaller than the threshold.

Next, the MS 400 attempts to access the selected BS in step 420.

Figure 5:
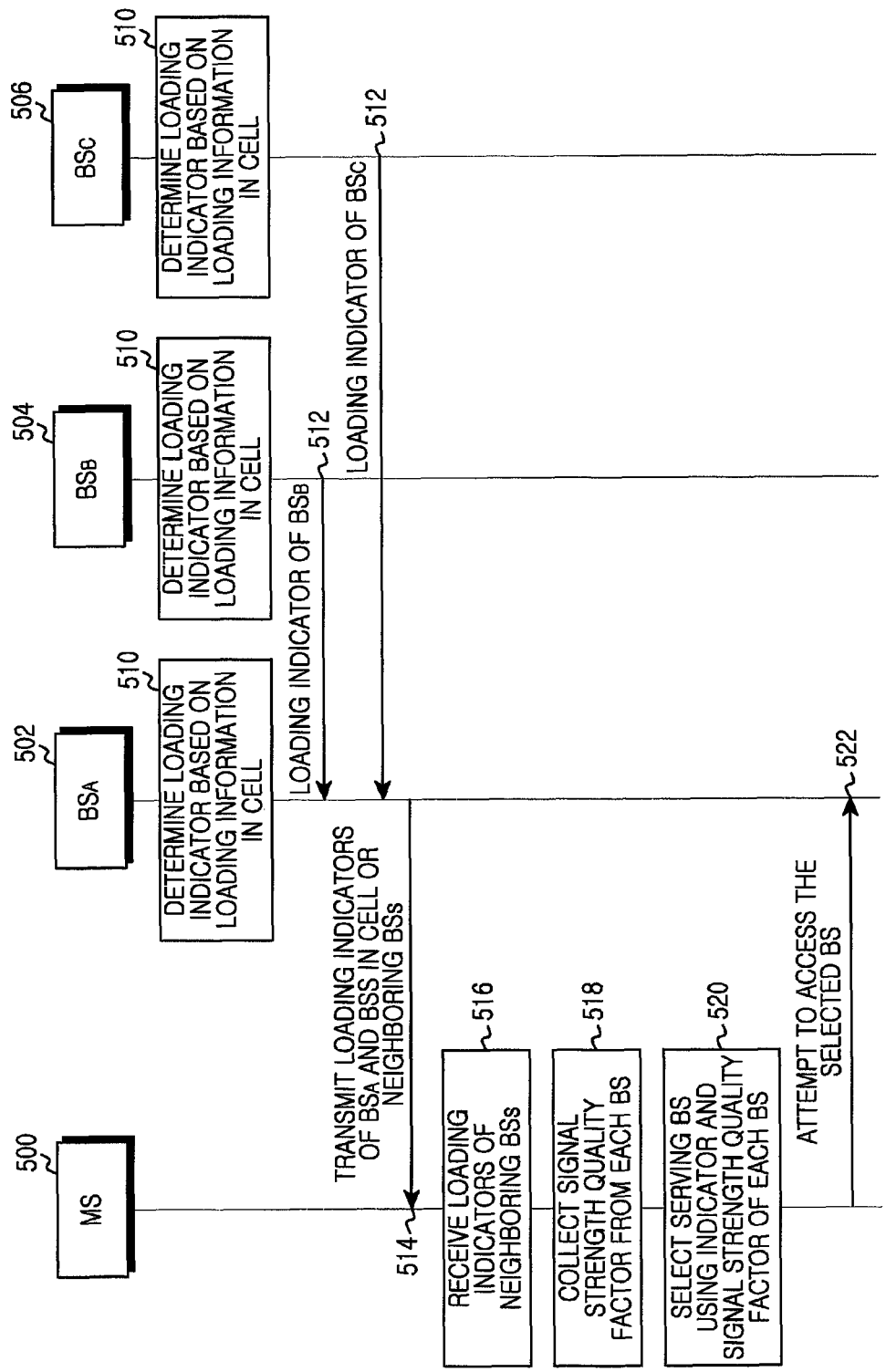
FIG. 5 illustrates signal flows of the cell selection of the mobile station in the heterogeneous network system according to another exemplary embodiment of the present invention.

FIG. 5 illustrates signal flows of the cell selection of the MS in the heterogeneous network system according to another exemplary embodiment of the present invention. Herein, one BS transmits its loading indicator and the loading indicators of the neighboring BSs by exchanging the loading indicator between the BSs. A $BS_A$ 502, a $BS_B$ 504, and a $BS_C$ 506 can be the macro BSs or the compact BSs.

Referring to FIG. 5, the BSs 502, 504, and 506 each collect the loading information in their cell and determine the loading indicator based on the collected loading information in step 510. Next, the $BS_B$ 504 and the $BS_C$ 506 transmit their loading indicator to the $BS_A$ 502 in step 512.

The $BS_A$ 502 receiving the loading indicators of the $BS_B$ 504 and the $BS_C$ 506 transmit its loading indicator and the received loading indicators of the $BS_B$ 504 and the $BS_C$ 506 to an MS in the cell in step 514. In doing so, the $BS_A$ 502 can transmit the loading indicators through the broadcast channel receivable by one or more MSs, the broadcast channel receivable even by MSs which merely complete initial synchronization, the frame header, or the preamble.

The MS 500 traveling in the cell coverage of the $BS_A$ 502 receives the loading indicator of the $BS_A$ 502 and the loading indicators of the $BS_B$ 504 and the $BS_C$ 506 from the $BS_A$ 502 in step 516, and collects the signal strength quality factor of the BSs 502, 504, and 506 in step 518.

Using the received loading indicators and the signal strength quality factor, the MS 500 selects one of the BSs 502, 504, and 506 as its serving BS in step 520. Herein, the MS 500 can select the serving BS based on Equation 3 through Equation 8. The MS 500 compares the signal strength quality factor of the BSs and a preset threshold, and excludes the corresponding BS from the cell selection when the BS has the signal strength quality factor smaller than the threshold.

Next, the MS 500 attempts to access the selected BS in step 522.

Figure 6:
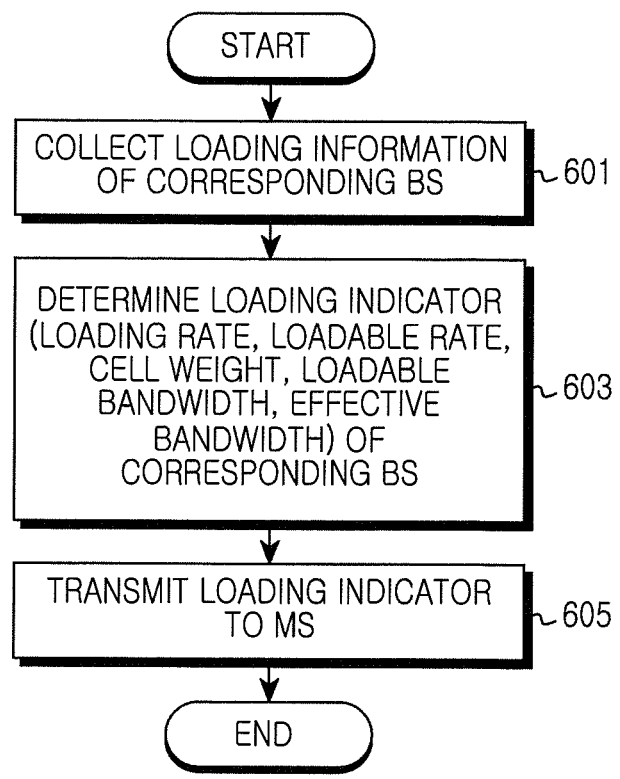
FIG. 6 illustrates a loading indicator transmission method of a base station in the heterogeneous network system according to an exemplary embodiment of the present invention.

FIG. 6 illustrates a loading indicator transmission method of the BS in the heterogeneous network system according to an exemplary embodiment of the present invention. FIG. 6 depicts the operations of the BS when each BS transmits its loading indicator directly to the MS. Herein, the BS can be the macro BS or the compact BS.

Referring to FIG. 6, the BS collects the loading information in its cell in step 601 and determines the loading indicator based on the collected loading information in step 603. Herein, the loading indicator can use the loading rate, the loadable rate, the cell weight, the loadable bandwidth, the effective bandwidth, and the expected capacity.

In step 605, the BS transmits its determined loading indicator to the MS in the cell. In so doing, the BS can transmit the loading indicator through the broadcast channel receivable by one or more MSs, the broadcast channel receivable even by MSs which merely the complete initial synchronization, the frame header, or the preamble.

Herein, the BS can repeatedly determine the loading indicator and transmit the determined loading indicator to the MS at preset intervals.

Figure 7:
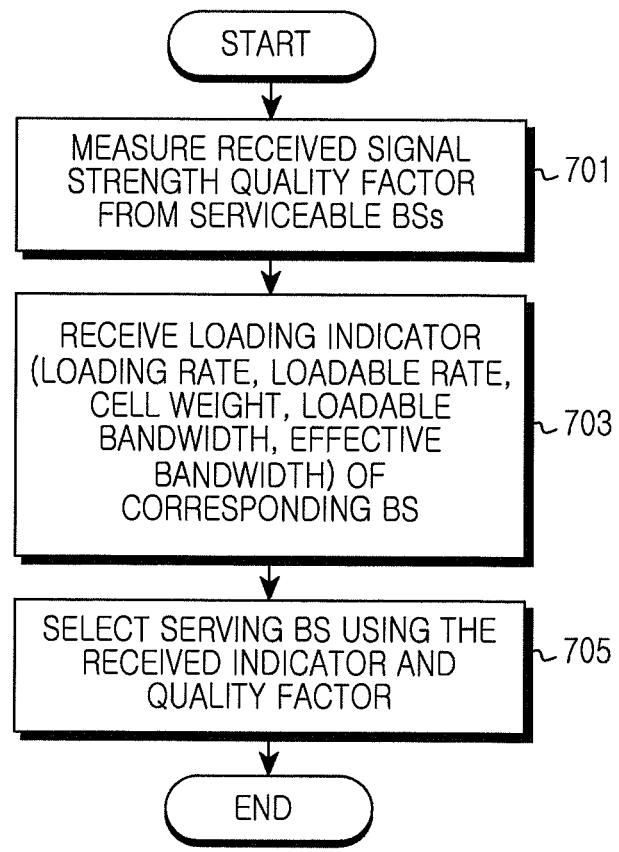
FIG. 7 illustrates a cell selection method of the mobile station in the heterogeneous network system according to an exemplary embodiment of the present invention.

FIG. 7 depicts a cell selection method of the MS in the heterogeneous network system according to an exemplary embodiment of the present invention. FIG. 7 illustrates the operations of the MS when each BS transmits its loading indicator directly to the MS.

Referring to FIG. 7, the MS measures the signal strength quality factor from the serviceable BSs in step 701. Herein, the serviceable BSs are the BSs from which signals can be received and thus accessible. The MS can compare the signal strength quality factor measured for each BS and the preset threshold and exclude the BS having the measured signal strength quality factor smaller than the threshold from the cell selection BSs.

In step 703, the MS receives the loading indicator of each BS from the serviceable BSs. Herein, the loading indicator can include the loading rate, the loadable rate, the cell weight, the loadable bandwidth, the effective bandwidth, and the expected capacity of the BS.

In step 705, the MS selects the serving cell by considering both of the measured signal strength quality factor and the received loading indicators. Herein, the MS can select the serving BS based on Equation 3 through Equation 8. The MS selects the BS which provides the highest transmission capacity according to the traffic type. That is, the MS can select different BSs as its serving BS with respect to the traffics.

Next, the MS can attempt to access the selected BS.

So far, the MS collects the signal strength quality factor of the serviceable BSs and then receives the loading indicator from the BS. Yet, it is noted that the sequence of the signal strength quality factor collection and the loading indicator reception can be changed.

Figure 8:
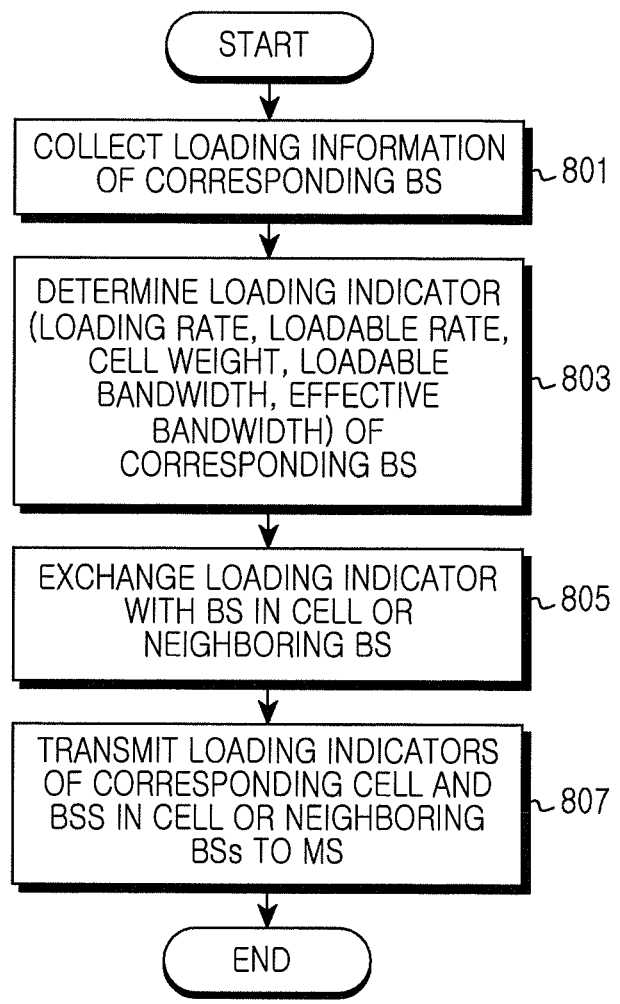
FIG. 8 illustrates a loading indicator transmission method of the base station in the heterogeneous network system according to another exemplary embodiment of the present invention.

FIG. 8 illustrates a loading indicator transmission method of the BS in the heterogeneous network system according to another exemplary embodiment of the present invention. In FIG. 8, one BS transmits its loading indicator and the loading indicators of the neighboring BSs by exchanging the loading indicator between the BSs. Herein, the BS can be the macro BS or the compact BS.

Referring to FIG. 8, the BS collects the loading information in its cell in step 801 and determines the loading indicator based on the collected loading information in step 803. Herein, the loading indicator can use the loading rate, the loadable rate, the cell weight, the loadable bandwidth, the effective bandwidth, and the expected capacity.

The BS exchanges the loading indicator with the BSs in the cell or the neighboring BSs in step 805, and then transmits its loading indicator and the loading indicators received from the BSs in the cell or the neighboring BSs, to the MS in the cell in step 807. In so doing, the BS can transmit the loading indicators through the broadcast channel receivable by one or more MSs, the broadcast channel receivable even by MSs which merely the complete initial synchronization, the frame header, or the preamble.

Herein, the BS can repeatedly determine the loading indicator, exchange the determined loading indicator with the neighboring BS, and transmit the loading indicator to the MS at preset intervals.

Figure 9:
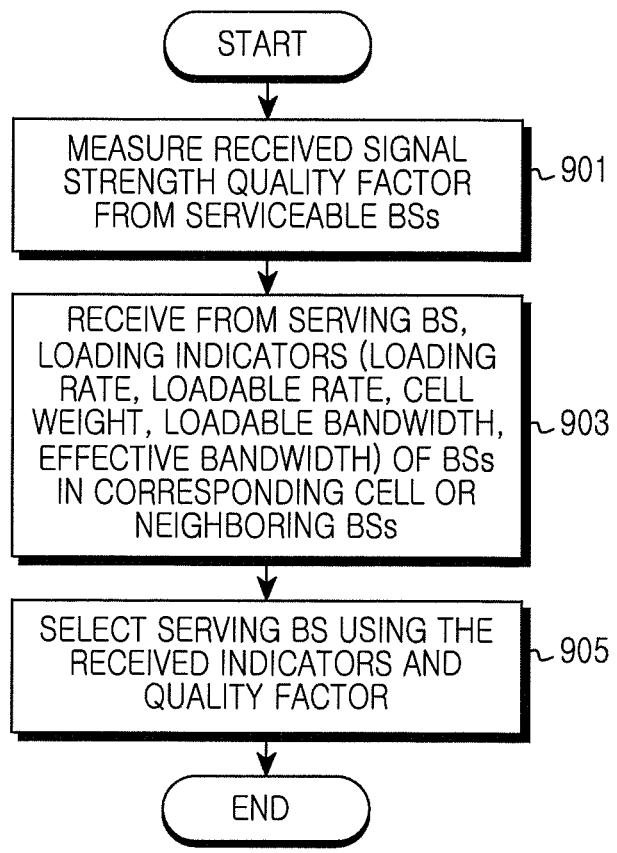
FIG. 9 illustrates a cell selection method of the mobile station in the heterogeneous network system according to another exemplary embodiment of the present invention.

FIG. 9 illustrates a cell selection method of the MS in the heterogeneous network system according to another exemplary embodiment of the present invention. FIG. 9 illustrates the operations of the MS when one BS transmits its loading indicator and the loading indicators of the neighboring BSs by exchanging the loading indicator between the BSs.

Referring to FIG. 9, the MS measures the signal strength quality factor from the serviceable BSs in step 901. Herein, the serviceable BSs are the BSs from which signals can be received and thus accessible. The MS can compare the signal strength quality factor measured for each BS and the preset threshold, and exclude the BS having the measured signal strength quality factor smaller than the threshold from the cell selection BSs.

In step 903, the MS receives the loading indicator of the serving BS and the loading indicators of the BSs in the cell of the serving BS or the neighboring BSs from the serving BS. Herein, the loading indicator can include the loading rate, the loadable rate, the cell weight, the loadable bandwidth, the effective bandwidth, and the expected capacity of the BS.

In step 905, the MS selects the serving cell by considering both of the measured signal strength quality factor and the received loading indicators. Herein, the MS can select the serving BS based on Equation 3 through Equation 8. The MS selects the BS which provides the highest transmission capacity according to the traffic type. That is, the MS can select different BSs as its serving BS with respect to the traffics.

Next, the MS can attempt to access the selected BS.

While the MS first collects the signal strength quality factor of the serviceable BSs and then receives the loading indicators from the BS, the sequence of the signal strength quality factor collection and the loading indicator reception can be changed.

Figure 10:
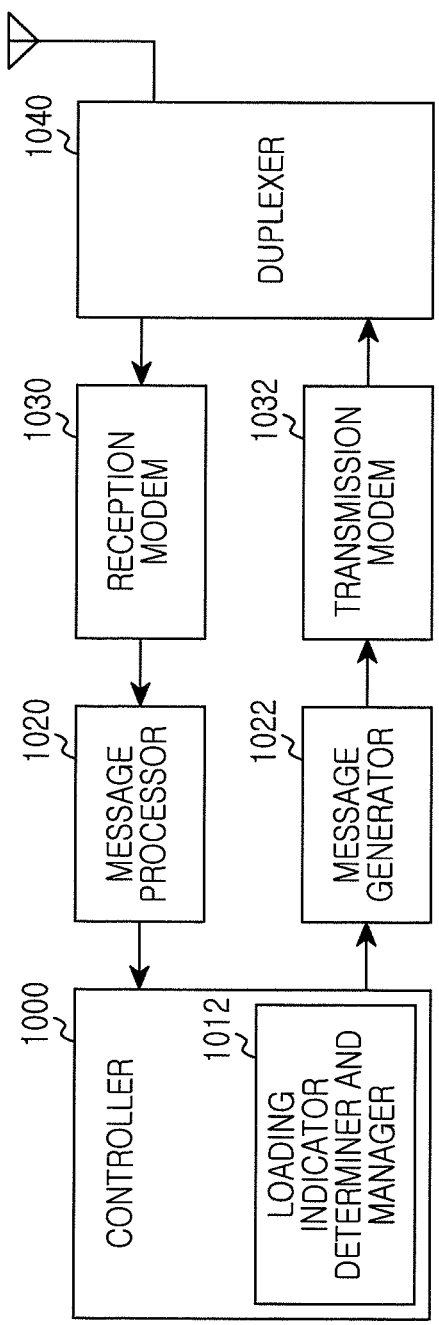
FIG. 10 illustrates the base station in the heterogeneous network system according to an exemplary embodiment of the present invention.

FIG. 10 is a block diagram of the BS in the heterogeneous network system according to an exemplary embodiment of the present invention.

Referring to FIG. 10, the BS includes a controller 1000, a message processor 1020, a message generator 1022, a reception modem 1030, a transmission modem 1032, and a duplexer 1040.

Referring to FIG. 10, the controller 1000 controls and processes the operations of the BS. In particular, the controller 1000, which includes a loading indicator determiner and manager 1012, controls and processes to determine the loading indicator by collecting the loading information in the cell. The loading indicator determiner and manager 1012 exchanges the loading indicator with the BSs in the cell or the neighboring BSs, and controls and processes to transmit the collected loading indicators to the MS in the cell.

The message processor 1020 decomposes a message received through the reception modem 1030 and provides the result to the controller 1000. For example, the message processor 1020 provides the controller 1000 with the loading indicators exchanged with the BSs in the cell or the neighboring BS.

The message generator 1022 generates a message to transmit and outputs the message to the transmission modem 1032 under the control of the controller 1000. For example, under the control of the controller 1000, the message generator 1022 generates a message including the loading indicator of the BS and a message including the loading indicator of the BS and the loading indicator exchanged with the BS in the cell or the neighboring BS.

The reception modem 1030 restores data from the signal fed from the duplexer 1040 and sends the restored data to the message processor 1020. For example, the reception modem 1030 includes a Radio Frequency (RF) receiving block, a demodulating block, a channel decoding block, and the like. The RF receiving block includes a filter and an RF preprocessor. When the wireless communication system conforms to Orthogonal Frequency Division Multiplexing (OFDM), the demodulating block includes a Fast Fourier Transform (FFT) operator for extracting the data from subcarriers. The channel decoding block includes a demodulator, a deinterleaver, and a channel decoder.

The transmission modem 1032 converts the message or the transmit data output from the message generator 1022 to a form for the transmission over the radio resource, and provides the converted message or data to the duplexer 1040. For example, the transmission modem 1032 includes a channel encoding block, a modulating block, and an RF transmitting block. The channel encoding block includes a modulator, an interleaver, and a channel encoder. When the wireless communication system adopts the OFDM scheme, the modulating block includes an Inverse FFT (IFFT) operator for mapping the data to the subcarriers. The RF transmitting block includes a filter and an RF preprocessor.

The duplexer 1040 transmits a transmit signal fed from the transmission modem 1032 via an antenna and provides a receive signal from the antenna to the reception modem 1030 according to the duplexing scheme.

Figure 11:
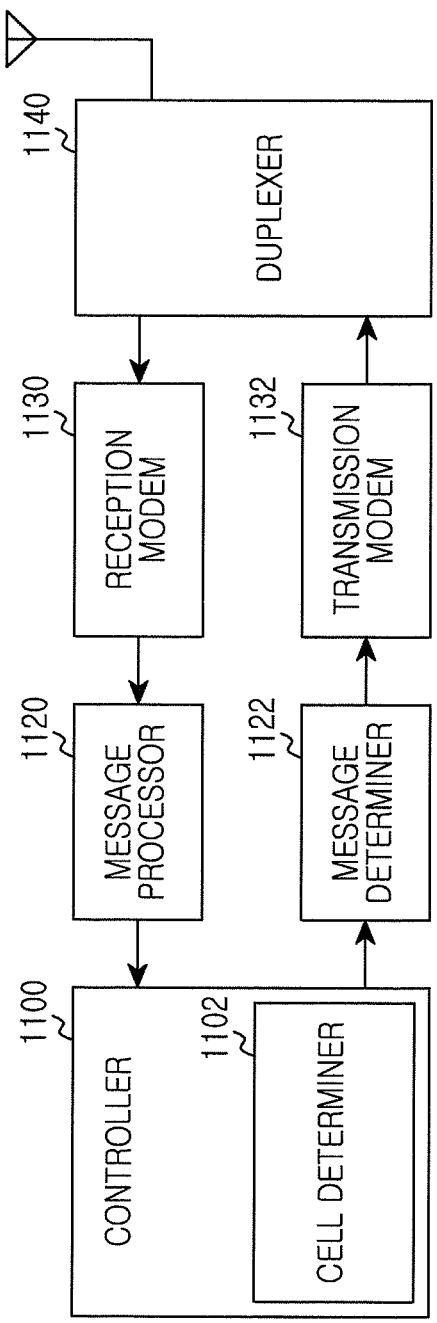
FIG. 11 illustrates the mobile station in the heterogeneous network system according to an exemplary embodiment of the present invention.

FIG. 11 is a block diagram of the MS in the heterogeneous network system according to an exemplary embodiment of the present invention.

Referring to FIG. 11, the MS includes a controller 1100, a message processor 1120, a message generator 1122, a reception modem 1130, a transmission modem 1132, and a duplexer 1140.

The controller 1100 controls and processes the operations of the MS. In particular, the controller 1100, which includes a cell selector 1102, collects the loading indicators and the signal strength quality factor of the serviceable BSs, and controls and processes to select the serving BS based on the loading indicators and the signal strength quality factor of the BSs. The cell selector 1102 can select the serving BS based on Equation 3 through Equation 8.

The message processor 1120 decomposes a message received through the reception modem 1130 and provides the result to the controller 1100. For example, the message processor 1120 provides the controller 1000 with the loading indicator received from the serviceable BS.

The message generator 1122 generates a message to transmit and outputs the message to the transmission modem 1132 under the control of the controller 1100. For example, under the control of the controller 1100, the message generator 1122 generates a message for attempting the access to the selected serving BS.

The reception modem 1130 restores data from the signal fed from the duplexer 1140 and sends the restored data to the message processor 1120. For example, the reception modem 1130 includes an RF receiving block, a demodulating block, a channel decoding block, and the like. The RF receiving block includes a filter and an RF preprocessor. When the wireless communication system conforms to the OFDM, the demodulating block includes an FFT operator for extracting the data from subcarriers. The channel decoding block includes a demodulator, a deinterleaver, and a channel decoder.

The transmission modem 1132 converts the message or the transmit data output from the message generator 1122 to the form for the transmission over the radio resource, and provides the converted message or data to the duplexer 1140. For example, the transmission modem 1132 includes a channel encoding block, a modulating block, and an RF transmitting block. The channel encoding block includes a modulator, an interleaver, and a channel encoder. When the wireless communication system adopts the OFDM scheme, the modulating block includes an IFFT operator for mapping the data to the subcarriers. The RF transmitting block includes a filter and an RF preprocessor.

The duplexer 1140 transmits a transmit signal fed from the transmission modem 1132 via an antenna and provides a receive signal from the antenna to the reception modem 1130 according to the duplexing scheme.

Since the MS selects its serving cell by considering the signal strength quality factor and the loading indicator of the neighboring BSs in the heterogeneous network system, it is possible to minimize the concentration of the plurality of the MSs in a particular BS and the absence of the MS serviced by the particular BS by reflecting the loadable degree and band for each neighboring BS. Therefore, the transmission efficiency of the system can be increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Mobile Station (MS) for selecting a cell in a heterogeneous network system, the method comprising:
   receiving a loading indicator for each of a plurality of Base Stations (BS);
   measuring channel state information for each of the BSs; and
   selecting one of the BSs using the loading indicator and the channel state information, wherein the selecting of one of the BSs comprises:
      determining an expected capacity per traffic type of the MS for each of the BSs using the loading indicator and the channel state information; and
      selecting a BS having a largest expected capacity per traffic type of the MS among the BSs.

2. The method of claim 1, wherein the loading indicator comprises at least one of: a loading rate, a loadable rate, a cell weight, a loadable bandwidth, an effective bandwidth, or an expected capacity, and
   the channel state information comprises signal strength quality factor information indicating channel state between the MS and a corresponding BS.

3. The method of claim 1, wherein the selecting of one of the BSs using the loading indicator and the channel state information comprises:
   comparing the channel state information of each of the BSs and a preset threshold; and
   excluding a BS having the channel state information smaller than the preset threshold, among the BSs, from cell selection.

4. The method of claim 1, wherein the selected BS having the largest expected capacity per traffic type is determined based on:

$$SelectBS = \underset{i \in [0, I-1]}{\operatorname{argmax}}(BW_{\mathit{effective}}(i, T) \times \log_{10}(1 + SINR_i))$$

where $BW_{\mathit{effective}}(i,T)$ is effective bandwidth of a BS i for traffic T, and $SINR_i$ is a signal-to-noise ratio (SINR) of the BS i, wherein the SINR is included in the channel state information.

5. The method of claim 1, wherein selecting the BS having the largest expected per traffic type of the MS capacity comprises selecting different BSs as a serving BS for different types of traffic.

6. The method of claim 1, wherein the loading indicator for each of the BSs is received from a serving BS or from each of the BSs.

7. A method of operating a Base Station (BS) for cell selection of a Mobile Station (MS) in a heterogeneous network system, the method comprising:
   determining a loading indicator in a cell; and
   transmitting the determined loading indicator and a signal for the MS to measure channel state information to an MS in the cell,
   wherein the MS determines an expected capacity per traffic type of the MS for the BS using the loading indicator and the channel state information to select a serving cell in the heterogeneous network system.

8. The method of claim 7, wherein the loading indicator in the cell comprises at least one of: a loading rate, a loadable rate, a cell weight, a loadable bandwidth, an effective bandwidth, or an expected capacity.

9. The method of claim 7, wherein the loading indicator is determined using at least one of: a number of MSs in a current cell, a number of MSs in an active mode in the current cell, a data amount per traffic queuing in a queue buffer of the BS, a required data transmission space accumulated, or an indicator expecting future transmission.

10. The method of claim 7, wherein the transmitting of the determined loading indicator to the MS in the cell comprises:
    exchanging the determined loading indicator with a neighboring BS; and
    transmitting the determined loading indicator and an exchanged loading indicator of the neighboring BS to the MS.

11. An apparatus of a Mobile Station (MS) for selecting a cell in a heterogeneous network system, the apparatus comprising:
    a transceiver configured to receive a loading indicator for each of a plurality of Base Stations (BSs); and
    a controller configured to measure a channel state information for each of the BSs, determine an expected capacity per traffic type of the MS for each of the BSs using the loading indicator and the channel state information, and select a BS having a largest expected capacity per traffic type of the MS among the BSs.

12. The apparatus of claim 11, wherein the loading indicator comprises at least one of: a loading rate, a loadable rate, a cell weight, a loadable bandwidth, an effective bandwidth, or an expected capacity, and
    the channel state information comprises signal strength quality factor information indicating channel state between the MS and a corresponding BS.

13. The apparatus of claim 11, wherein the controller is configured to compare the channel state information of each of the BSs and a preset threshold, and exclude a BS having the channel state information smaller than the preset threshold, among the BSs, from cell selection.

14. The apparatus of claim 11, wherein the controller is configured to select different BSs as a serving BS for different types of traffic.

15. The apparatus of claim 14, wherein the selected BS having the largest expected capacity per traffic type is determined based on:

$$SelectBS = \underset{i \in [0, I-1]}{\mathrm{argmax}}(BW_{effective}(i, T) \times \log_{10}(1 + SINR_i))$$

where $BW_{effective}(i,T)$ is effective bandwidth of a BS i for traffic T, and $SINR_i$ is a signal-to-noise ratio (SINR) of the BS i, wherein the SINR is included in the channel state information.

16. The apparatus of claim 11, wherein the transceiver is configured to receive the loading indicator for each of the BSs from a serving BS or from each of the BSs.

17. An apparatus of a Base Station (BS) for cell selection of a Mobile Station (MS) in a heterogeneous network system, the apparatus comprising:
    a controller configured to determine a loading indicator in a cell; and
    a transceiver configured to transmit the determined loading indicator and a signal for the MS to measure channel state information to an MS in the cell,
    wherein the MS is configured to determine an expected capacity per traffic type of the MS for the BS using the loading indicator and the channel state information to select a serving cell in the heterogeneous network system.

18. The apparatus of claim 17, wherein the loading indicator in the cell comprises at least one of a loading rate, a loadable rate, a cell weight, a loadable bandwidth, an effective bandwidth, or an expected capacity.

19. The apparatus of claim 17, wherein the controller is configured to determine the loading indicator using at least one of: a number of MSs in a current cell, a number of MSs in an active mode in the current cell, a data amount per traffic queuing in a queue buffer of the BS, a required data transmission space accumulated, or an indicator expecting future transmission.

20. The apparatus of claim 17, wherein the transceiver is configured to exchange the determined loading indicator with a neighboring BS and transmit the determined loading indicator and an exchanged loading indicator of the neighboring BS to the MS under control of the controller.

* * * * *